(12) United States Patent
Lin

(10) Patent No.: US 7,871,196 B2
(45) Date of Patent: *Jan. 18, 2011

(54) JUICER SAFETY DEVICE

(76) Inventor: Kuan-Chih Lin, P.O. Box 8-71, Tainan, 71052 (TW)

( * ) Notice: Subject to any disclaimer, the term of this patent is extended or adjusted under 35 U.S.C. 154(b) by 768 days.

This patent is subject to a terminal disclaimer.

(21) Appl. No.: 11/839,545

(22) Filed: Aug. 16, 2007

(65) Prior Publication Data

US 2009/0045272 A1 Feb. 19, 2009

(51) Int. Cl.
*A47J 43/046* (2006.01)
(52) U.S. Cl. ...................... 366/206; 241/37.5
(58) Field of Classification Search ............. 366/199, 366/205, 206, 314, 601; 241/37.5, 282.1, 241/282.2; 99/348
See application file for complete search history.

(56) References Cited

U.S. PATENT DOCUMENTS

| | | | | |
|---|---|---|---|---|
| 1,997,873 A * | 4/1935 | Poplawski | ................ | 366/206 |
| 2,284,155 A * | 5/1942 | Landgraf | ................ | 241/282.2 |
| 4,108,054 A * | 8/1978 | Klocker et al. | ................ | 99/348 |
| 5,353,697 A * | 10/1994 | Venturati et al. | ................ | 99/492 |
| 5,567,049 A * | 10/1996 | Beaudet et al. | ................ | 366/206 |
| 6,513,966 B1 * | 2/2003 | Gort-Barten et al. | ................ | 366/205 |
| 6,540,394 B2 * | 4/2003 | Juriga | ................ | 366/205 |
| 6,554,466 B1 * | 4/2003 | Lee | ................ | 366/206 |
| 6,568,843 B1 * | 5/2003 | Lai | ................ | 366/206 |
| 6,629,492 B1 * | 10/2003 | Li | ................ | 99/337 |
| 6,637,681 B1 * | 10/2003 | Planca et al. | ................ | 241/37.5 |
| 6,910,800 B2 * | 6/2005 | Wu | ................ | 366/199 |
| 7,407,320 B1 * | 8/2008 | Lin | ................ | 366/206 |
| 2002/0071340 A1 * | 6/2002 | Juriga | ................ | 366/205 |

* cited by examiner

*Primary Examiner*—David L Sorkin

(57) ABSTRACT

A juicer safety device includes a sidearm formed with the container and having a groove in a sidewall, a contact member on an upper surface of a chamber, a spring on the contact member, a position guide member in a sidewall of the chamber, and two projecting ridges with a slide groove between them; a push rod kept in position by the contact member, the position guide member and the two projecting ridges and having a push block with a side shoved by the spring and a guide block in the slide groove; a cap having a rotary member. The cap is closed on the container with the rotary member rotated to let a clamp block insert in the sidearm and push the push rod downwards to move a contact rod of the push rod downwards, touching and turning on a micro switch, which turns on the juicer to operate.

4 Claims, 7 Drawing Sheets

JUICER SAFETY DEVICE

BACKGROUND OF THE INVENTION

1. Field of the Invention

This invention relates to a juicer safety device, particularly to one having a cap provided with a rotary member for rotating after the cap is closed on a container, forcing a contact block on the rotary member to insert in a chamber of a sidearm so as to push down a push rod with a contact rod extending down from the lower end of the push rod to touch and turn on a micro switch to turn on the power of the juicer, safe and convenient to handle.

2. Description of the Prior Art

Conventional juicers generally have no safety device, starting to operate once turned on, and users often start them with a cap not yet closed on a container, causing smashed fruit bits and fruit juice in the container to splash out. Moreover, if a young child should dare to use it without parents not at the site, the child might put a hand into the container during operation to cause a dangerous accident.

There is a juicer disclosed in a U.S. Pat. No. 6,554,466 B1, as shown in FIGS. 1 and 2, which includes a main base 1, a container 10 set on the main base 1, a sidearm 11 with a chamber 12 formed at a side of the container 10, a slide groove 110 formed in a top surface of the sidearm 11, and a push button 13 fixed on an upper portion of the sidearm 11. The push button 13 has a inclined front side with a fitting groove 130, a spring 131 placed behind the push button 13, which has one end hooked at an inner wall of the chamber 12 of the sidearm 11. Further, a cap 14 closes on the container 10, and a press projection 140 formed downward on an underside of an outer edge of the cap 14 and fitting in the fitting groove 130 of the push button 13. The press projection 140 has a sloped sidewall, and a connect rod 15 is provided in the chamber 12 of the sidearm 11, having a projection 150 on an upper end, and a spring 151 set under the upper end for pushing the connect rod upward. The connect rod 15 has its lower end inserted in a lower portion of the container 10 and fixed with a contact rod 152, which extends into the main base 1 to be located just on a micro switch 160 fixed in the a switch base 16, and a spring 153 is fitted around the contact rod 152 for pushing the connect rod 15 upward.

When the cap 14 is not yet closed on the container 10, the micro switch 160 is OFF, even the switch of the juicer is turned on. The cap 14 has to be closed and let the press projection 140 is aligned to the push button 13 and the slide groove 110, and then the cap 14 is pressed down to force the push button 13 to shift and let the press projection 140 inert into the sidearm 11 with the connect rod 15 kept on moving down so that the contact rod 152 at the lower end of the contact rod 152 may move down to touch the micro switch 160 for turning on the circuit. Then the juicer may start to operate for making juice.

However, the safety structure of the juicer of the U.S. Pat. No. 6,554,466 is rather complicated to handle. When the cap 14 is closed on the container 10, at first the press projection 140 of the cap 14 has to be aligned to the push button 13 and the slide groove 110, and then can be closed on the container 10, and further push the push button to shift so as to insert the press projection 140 in the chamber 12 of the sidearm 11 for pushing down the connect rod 15 to turn on the micro switch 160 to start the juicer. It is rather hard and complicated to handle.

SUMMARY OF THE INVENTION

The objective of the invention is to offer a juicer safety device usable conveniently and safely.

The main feature of the invention is to provide a juicer safety device includes:

a sidearm provided with a groove in a side of an upper end, a contact member fixed on an upper surface of a chamber of the sidearm, a spring placed at a front end of the contact member, a position guide member formed on a sidewall of the upper end of the chamber, two projecting ridges formed in parallel near an intermediate portion of the chamber, a slide groove) formed between the two projecting ridges;

a push rod set in the chamber of the sidearm and kept in position by the contact member, the position guide member and the two projecting ridges, the push rod having a push block at an upper end and a guide block near an intermediate portion, the push block having a side shoved by the spring of the contact member, the guide block fitting in the slide groove of the two projecting ridges; and, a cap having a rotary member on its upper surface, a clamp member respectively extending from two sides of the rotary member, a clamp block fixed at an outer edge of one of the clamp member for pushing the push block of the push rod.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
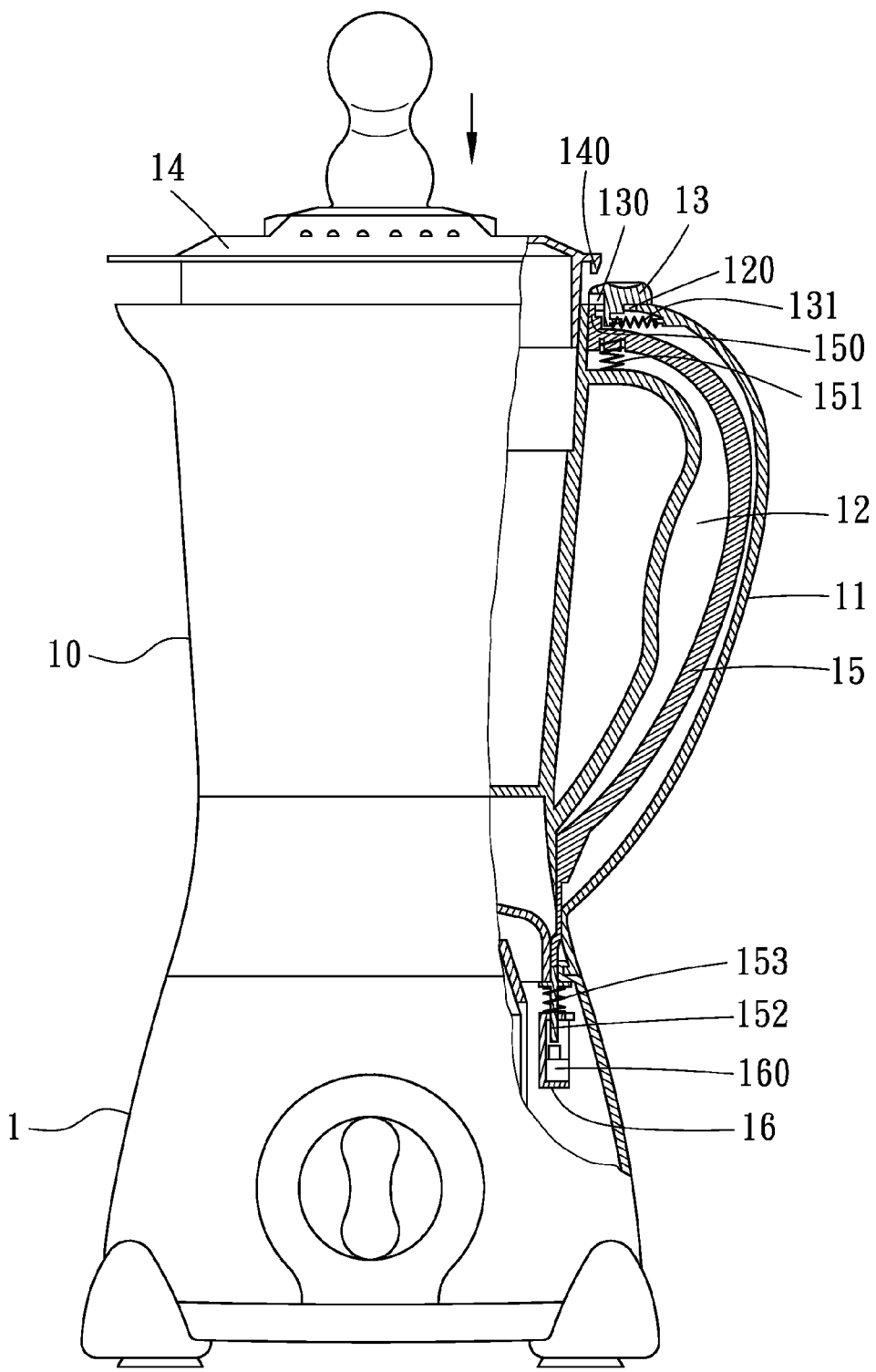
FIG. 1 is a side cross-sectional view of a conventional juicer, with a cap not yet closed on a container.
Figure 2:
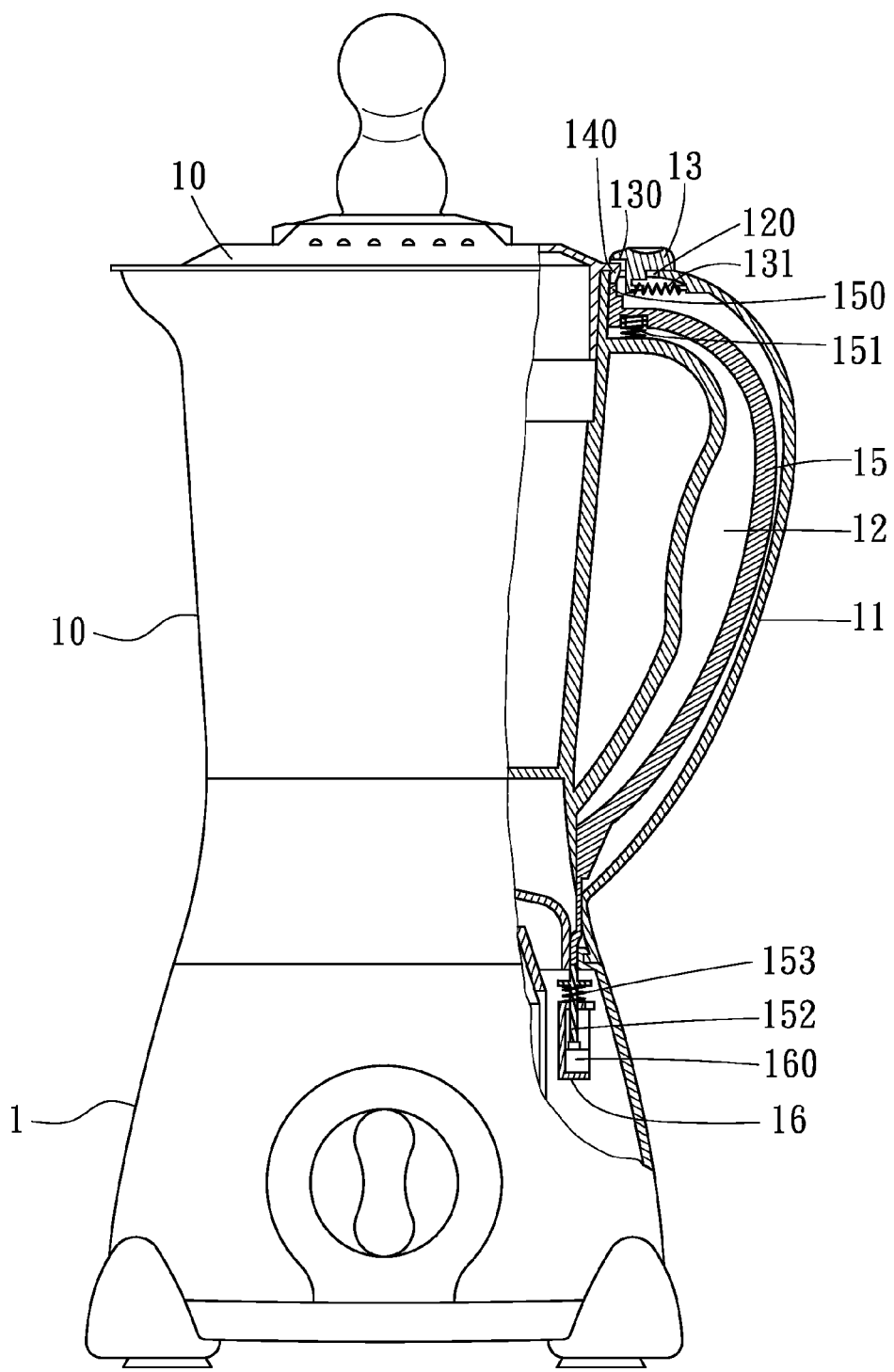
FIG. 2 is a side cross-sectional view of the conventional juicer, with the cap already closed on the container.
Figure 3:
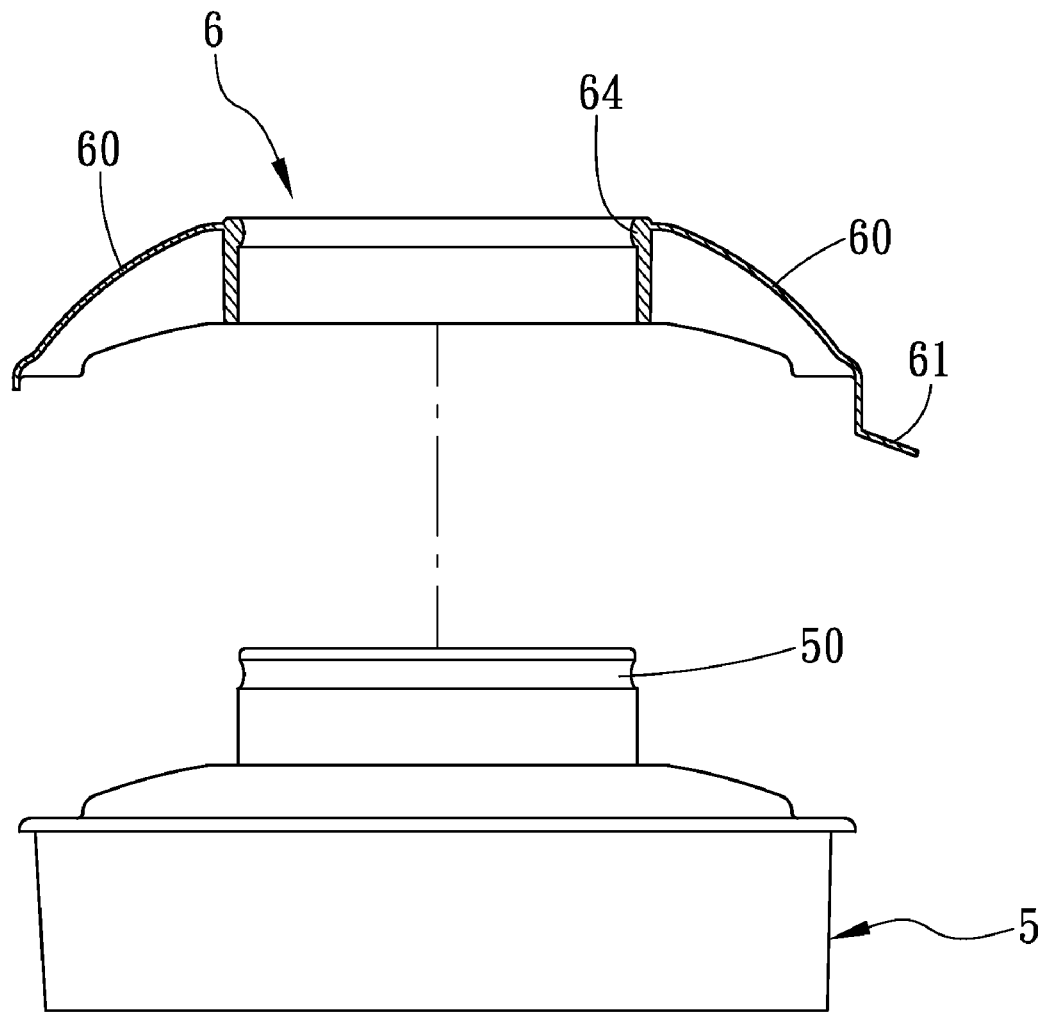
FIG. 3 is a side cross-sectional view of a rotary member separated from a cap in a juicer in the present invention.
Figure 4:
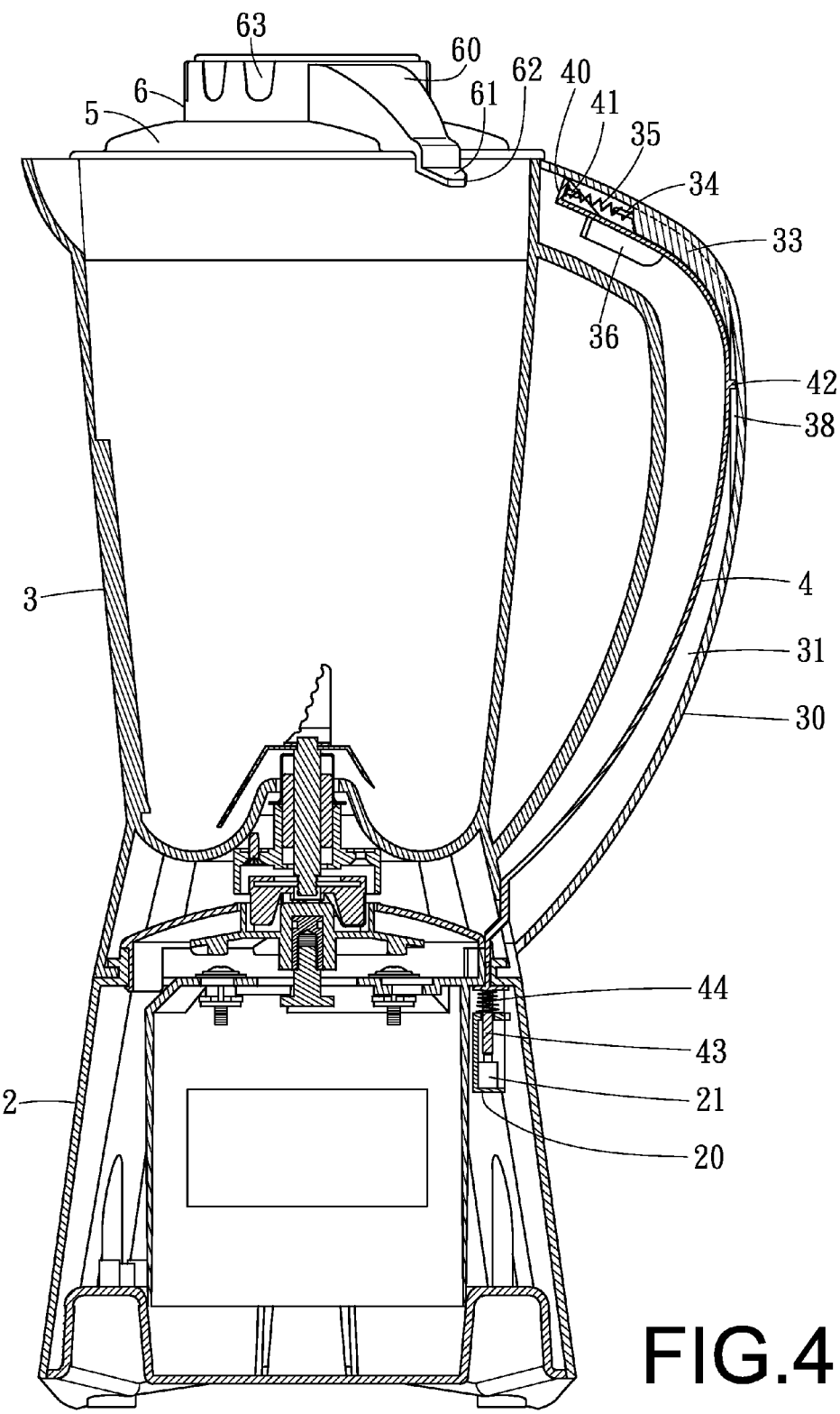
FIG. 4 is an upper view of the juicer safety device in the present invention, showing the rotary member of the cap not yet rotated to close fittingly on a container.
Figure 5:
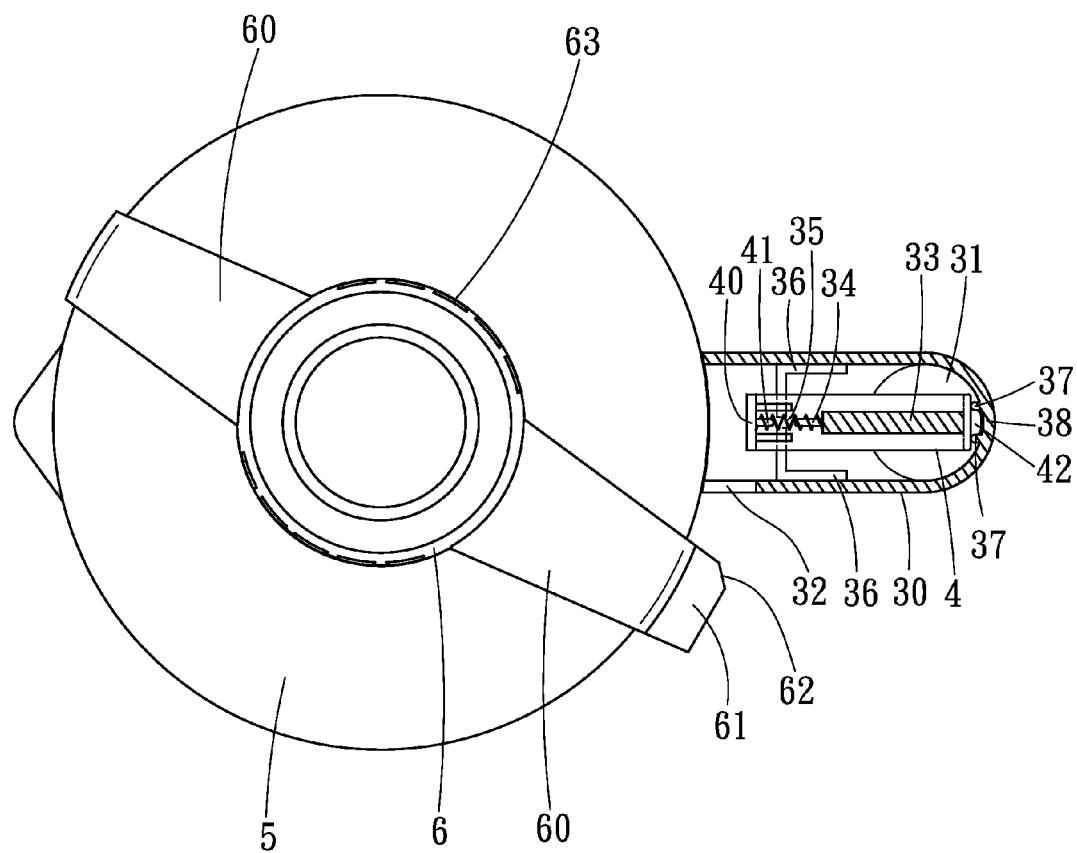
FIG. 5 is an upper view of the rotary member of the cap in the present invention, showing the rotary member of the cap not yet rotated to close fittingly on the container.
Figure 6:
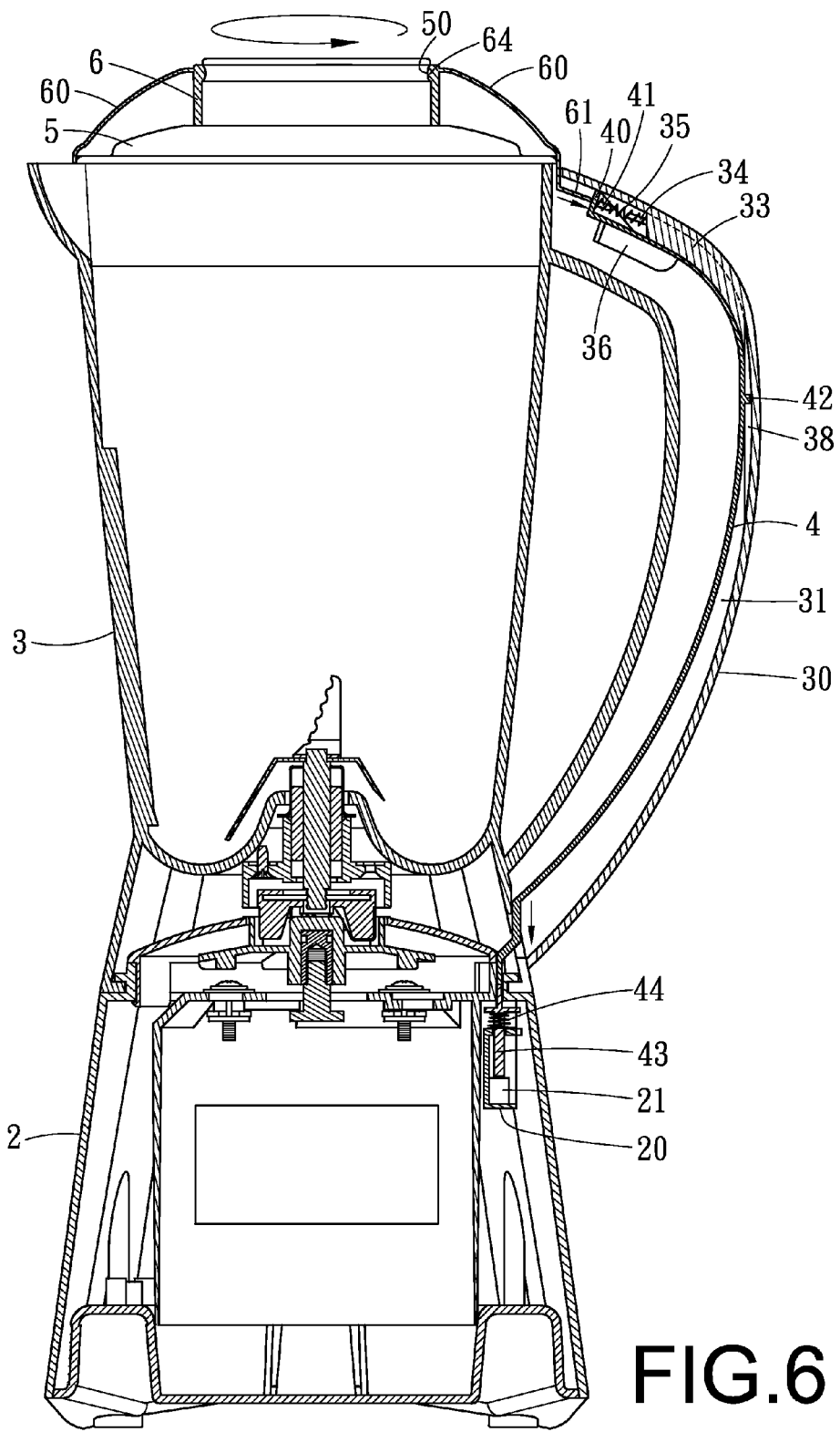
FIG. 6 is a side cross-sectional view of the rotary member of the cap in the present invention, shown the rotary member of the cap rotated to close fittingly on the container; and, FIG. 7 is an upper view of the rotary member of the cap rotated to close fittingly on the container.
Figure 7:
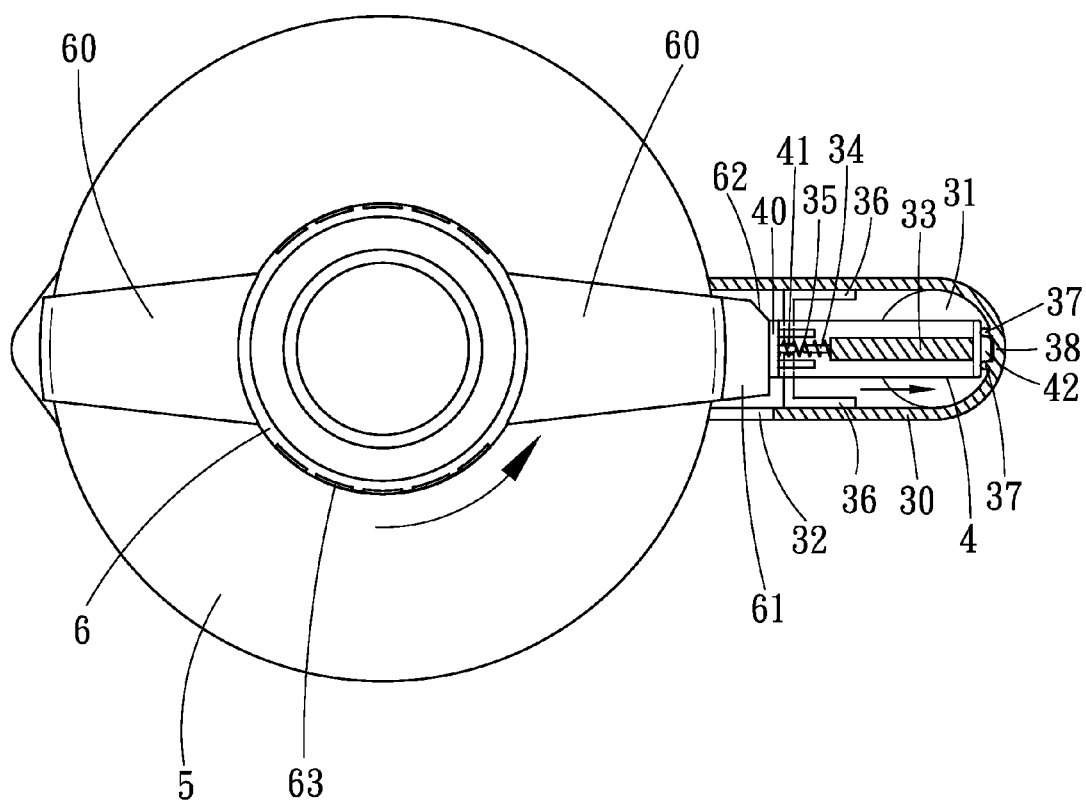

A preferred embodiment of a juicer safety device in the present invention, as shown in FIGS. 3, 4 and 5 includes a main base 2, a container 3, a sidearm 30, a push rod 4, a cap 5 and a rotary member 6.

The main base 2 has a switch base 20 set in its interior, and a micro switch 21 fixed in the switch base 20.

The container 3 is formed on the main base 2, with the sidearm 30 formed at one side of the container 3, and the sidearm 30 is provided with a chamber 31 in its interior, with a groove 32 formed in a side of an upper end. Further, a contact member 33 is set on an upper surface of the chamber 31, a projection 34 formed on a front end of the contact member 33, and a spring 35 fitted around the projection 34. In addition, a position guide member 36 respectively is fixed on two sidewalls of an upper end of the chamber 31, and two projection ridges 37 with a slide groove 38 therebetween are formed on the wall near an intermediate portion of the chamber 31 of the sidearm 30.

The push rod 4 is deposited lengthwise in the chamber 31, kept in position by the contact member 33, the position guide member 36 and two projection ridges 37 and having a push block 40 fixed on an upper end. The push block 40 has a projection 41 on a first side for one end of a spring 35 to hook with, and a guide block 42 near an intermediate portion. The guide block 42 fits in the slide groove 38 between the two projection ridges 37. The push rod 4 also has a contact rod 43 fixed downward with a lower end and having its lower end extending in the switch base 20 and located just on the micro switch 21, with a spring 44 fitted around the contact rod 43.

The cap 5 is closed on the container 3, having an annular groove 50 in an upper outer surface.

The rotary member 6 is placed on the cap 5, having a clamping member 60 respectively extending from two sides of the rotary member 6. One of the clamping members 60 has a clamp block 61 at an outer end, and the clamp block 61 has an inclined corner surface 62. The rotary member 6 is provided with plural recesses 63 spaced apart in an outer annular wall and an annular fitting edge 64 formed in an inner annular wall to fit with the annular groove 50 of the cap 5, as shown as FIG. 3.

In using, as shown in FIG. 4-7, when a user does not yet close the cap 5 on the container 3, the contact rod 43 of the push rod 4 does not contact the micro switch 21 in the switch base 20, so the juicer is not yet turned on, in a turned off condition. Next, the cap 5 is closed on the container 3, referring FIGS. 6 and 7, and then the rotary member 6 is rotated to let the fitting edge 60 of the rotary member 6 fit with the annular groove 50 of the cap 5. Meanwhile, the clamp block 61 of the clamp member 60 inserts in the chamber 31 of the sidearm 30 through the groove 32. The inclined corner surface 62 of the clamp block 61 will guide the push block 40 of the push rod 4 to shift to and stopped by a side of the clamp block 61, so the upper end of the push rod 4 may move down by pushing of the clamp block 61, and then the guide block 42 may slide in the slide groove 38 of the sidearm 30, permitting the push rod 4 move in a definite direction. Moreover, the spring 35 is compressed by the push block 40, so the contact rod 43 is also pushed down to compress the spring 44, with the lower end contacting the micro switch 21 to turn on, so the juicer is powered to operate.

After the juicer is cut off finishing operation, the rotary member 6 has to be rotated reversely, permitting the clamp block 50 separate from the sidearm 30, and then the cap 5 is ready to be taken off. When the clamp block 61 moves out of the sidearm 30, it no long pushes the push block 40 of the push rod 4, with the spring 35 recovering its elasticity to move back to its original position. At the same time, the push rod 4 is no more forced by the clamp block 61, with the spring 44 recovering its elasticity to push upward the contact rod 43 together with the push rod 4 so that the micro switch 21 in the switch base 20 may be turned off as shown in FIGS. 4 and 5, and thus the juicer is turned off. Then the juice made in the container 3 can be poured out for drinking. The safety device in the present invention is effected by rotation of the rotary member 6 positioned on the cap 5, with the clamp block 61 pushing the push rod 4 down to let the contact rod touch and turn on the micro switch 21, needing no alignment of any components, and moreover, the recesses 63 in the outer circumference of the rotary member 6 can help increase frictional force in holding for rotating, very convenient and safe to handle.

While the preferred embodiment of the invention has been described above, it will be recognized and understood that various modifications may be made therein and the appended claims are intended to cover all such modifications that may fall within the spirit and scope of the invention.

What is claimed is:

1. A juicer safety device comprising:

a main base provided with a switch base in its interior, said switch base provided with a micro switch therein;

a container formed on said main base, a sidearm formed on an outer side of said container and having a lengthwise hollow chamber;

a push rod moveably fixed in said chamber of said sidearm, said push rod having a contact rod extending down from its lower end, a spring fitted around said contact rod, said contact rod having its lower end protruding in said switch base of said main base and located just on said micro switch;

a cap closing on said container; and, characterized in that said sidearm is provided with a groove in a side of an upper end, a contact member fixed on an upper surface of said chamber of said sidearm, a spring placed at a front end of said contact member, a position guide member formed on a sidewall of said upper end of said chamber, two projecting ridges formed in parallel near an intermediate portion of said chamber, a slide groove formed between said two projecting ridges;

said push rod is set in said chamber of said sidearm and kept in position by said contact member, said position guide member and said two projecting ridges, and said push rod has a push block at an upper end and a guide block near an intermediate portion, said push block having a side shoved by said spring of said contact member, said guide block fitting in said slide groove of said two projecting ridges;

said cap has a rotary member on its upper surface, a clamp member respectively extending from two sides of said rotary member, a clamp block fixed at an outer edge of one of said clamp members for pushing said push block of said push rod.

2. The juicer safety device as claimed in claim 1, wherein said clamp block of said rotary member is provided with an inclined surface at one corner.

3. The juicer safety device as claimed in claim 1, wherein said rotary member is provided with plural recesses in an outer annular wall for convenience to rotate said rotary member.

4. The juicer safety device as claimed in claim 1 wherein said cap is provided with an annular groove in an outer surface; said rotary member is provided with an annular fitting edge in an inner annular wall to fit with said annular groove of said cap.

* * * * *